United States Patent
Nakayama et al.

(10) Patent No.: US 6,314,079 B1
(45) Date of Patent: *Nov. 6, 2001

(54) OPTICAL DISC AND METHOD FOR MANUFACTURING THE SAME

(75) Inventors: Hiroshi Nakayama; Jun Shimizu; Hiroshi Nomura, all of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,048

(22) Filed: Jun. 5, 1998

(30) Foreign Application Priority Data

Jun. 11, 1997 (JP) ................................. 09-154112

(51) Int. Cl.$^7$ ....................................... G11B 7/26
(52) U.S. Cl. ............................................ 369/284
(58) Field of Search ......................... 369/284, 275.1, 369/58, 272

(56) References Cited

U.S. PATENT DOCUMENTS

| | | | |
|---|---|---|---|
| 5,598,398 | * | 1/1997 | Best et al. ............................. 369/272 |
| 5,766,717 | * | 6/1998 | Kaneko et al. ....................... 428/64.1 |
| 5,831,952 | * | 11/1998 | Yamada et al. ......................... 369/58 |
| 5,846,627 | * | 12/1998 | Hong .................................... 428/64.1 |
| 5,883,877 | * | 3/1999 | Nishizawa .......................... 369/275.1 |
| 5,900,098 | * | 5/1999 | Mueller et al. .................... 156/275.7 |

FOREIGN PATENT DOCUMENTS

| | | | |
|---|---|---|---|
| 0329425 | * | 8/1989 | (EP) . |
| 58185050 | * | 10/1983 | (JP) . |
| 59198547 | * | 11/1984 | (JP) . |
| 63146250 | * | 6/1988 | (JP) . |
| 01263981 | * | 10/1989 | (JP) . |
| 02308442 | * | 12/1990 | (JP) . |
| 09167384 | * | 6/1997 | (JP) . |
| 09320132 | * | 12/1997 | (JP) . |

* cited by examiner

*Primary Examiner*—David L. Ometz
*Assistant Examiner*—Angel Castro
(74) *Attorney, Agent, or Firm*—Sonnenschein, Nath & Rosenthal

(57) ABSTRACT

An optical disc in which two optical discs are laminated together to realize high recording density and improved recording/reproducing characteristics for information signals, and a manufacturing method for the optical disc. When laminating a first disc having a first information recording portion on one surface of a first substrate to a second disc having a second information recording portion on one surface of a second substrate, the direction of warping of the first disc is set so as to be opposite to the direction of warping of the second disc, and the first disc is laminated to the second disc so that the surface of the first substrate having the first information recording surface will face the surface of the second substrate carrying the second information recording portion.

6 Claims, 4 Drawing Sheets

OPTICAL DISC AND METHOD FOR MANUFACTURING THE SAME

BACKGROUND OF THE INVENTION

1. Field of the Invention

This invention relates to an optical disc obtained on laminating two optical discs, each having an information recording surface on a substrate, and a method for manufacturing the optical disc.

2. Related Art

In the field of information recording, researches into the optical information recording system are proceeding briskly. This optical information recording system has a number of advantages, such as non-contact recording/reproduction, recording density higher by not less than one digit than with the magnetic recording medium recording system, or compatibility to memory configurations of the read-only, write-once and overwrite type memories. Thus, the optical information recording system is finding a wide field of application in both the industrial and domestic usages as a As an optical disc capable of recording/reproducing the information by optical means, there are a read-only optical disc, a phase-change type optical disc and a magneto-optical disc.

In keeping up with the demand for high recording density, a laminated optical disc of the sole surface readout type, that is an optical disc in which a laser light beam is adapted to fall on one disc side and the focal point position of the laser light beam is changed to selectively read and write the information from or on the two optical discs. This increases the volume of the information per optical disc. There is also no necessity of providing two pickups or a mechanism for moving the sole pickup to both sides. Therefore, the laminated disc is convenient in promptly having access to disc data or in reducing the size of the recording/reproducing apparatus.

For producing the sole surface readout type laminated disc, two manufacturing methods have been proposed. In the first one of the manufacturing methods, a substrate is molded by injection molding and a first information recording portion is formed on one substrate surface. On the first information recording portion is formed a reflective surface, for example, for forming an optical disc. On the surface of the information recording portion is applied a UV curable resin onto which a stamper carrying the embossed information is pressed in order to mold a second information recording portion. At this time, the thickness of the UV curable resin needs to be controlled precisely. Moreover, since the first and second information recording portions are formed by respective different methods, it is difficult to perform control so that the same signals can be recorded on the two recording surfaces.

In the second manufacturing method, a disc substrate is prepared by injection molding and an information recording portion is formed on one substrate surface for preparing an optical disc. This operation is repeated once to complete two optical discs. These two discs are laminated by bonding the surface of information recording portion of one of the discs to the surface of the other disc opposite to its information recording portion by a UV curable resin to complete a sole optical disc. In this case, the thickness of the UV curable resin is easier to control than with the first manufacturing method. Moreover, since the substrates and the information recording portions are prepared by the same method, the signals on the respective surfaces are of uniform quality.

However, the optical disc prepared by laminating two optical discs with the above-described second method has a drawback that focal point of the laser light of the reproducing apparatus is more susceptible to blurring than with the conventional single disc thus leading to unstable playback signals and deteriorated playback properties.

SUMMARY OF THE INVENTION

It is therefore an object of the present invention to provide an optical disc in which two optical discs are laminated together to realize high recording density and improved recording/reproducing characteristics, and a method for producing the optical disc.

For overcoming the above problem, the present inventors have conducted perseverant researches on the laminated disc of the single surface readout type and clarified the conditions responsible for occurrence of unstable recording and/or reproduction of information signals. This finding has led to completion of the present invention.

That is, in the laminated disc of the single surface readout system, that is in the optical disc having two laminated optical discs, obtained by the above-mentioned second manufacturing method, the two laminated optical discs are formed by the same molding method and the information recording portions are formed by the same method, the two optical discs thus formed tend to be warped in the same direction. With the laminated discs 30, 40 of the single surface readout system, the optical discs 31, 41, warped in the same direction, are laminated together, as shown in FIGS. 1 and 2, warping is accentuated, as a result of which focal point blurring of the laser light beam in the reproducing apparatus is produced to distort playback signals to deteriorate the quality of the information signals.

In one aspect, the present invention provides an optical disc including a first disc having a first information recording portion on one surface of a first substrate, and a second disc warped in a direction opposite to the direction of warping of the first disc, in which the second disc has a second information recording portion on one surface of a second substrate, and in which the first disc is laminated to the second disc so that the surface of the first disc having the information recording portion will face the surface of the second substrate carrying the second information recording portion.

During reproduction of the information signals, a laser light beam is incident on the surface of the first substrate not carrying the first information recording portion. The first disc or the second disc is selectively reproduced by varying the focal point position of the laser light beam.

With the above-described optical disc according to the present invention, the disc is prepared by laminating two optical discs warped in the opposite directions, the warping of one of the optical discs is counterbalanced by the warping of the other optical disc thus suppressing the warping of the laminated disc.

In another aspect, the present invention provides a method for producing an optical disc wherein, when laminating a first disc having a first information recording portion on one surface of a first substrate to a second disc having a second information recording portion on one surface of a second substrate, the direction of warping of the first disc set so as to be opposite to the direction of warping of the second disc. The first disc is laminated to the second disc so that the surface of the first substrate having the first information recording surface will face the surface of the second substrate carrying the second information recording portion.

With the above-described manufacturing method for an optical disc according to the present invention, since the disc is prepared by laminating two optical discs warped in the opposite directions, the warping of one of the optical discs is counterbalanced by the warping of the other optical disc thus suppressing the warping of the laminated disc.

Since the optical disc suppressed in warping is used on a reproducing apparatus capable of selectively reproducing the first or second optical discs with variable focal point positions of the laser light beam, the information signals can be reproduced satisfactorily.

With the manufacturing method for an optical disc according to the present invention, since the warping of one of two discs warped in opposite directions can be counterbalanced by that of the other disc, a laminated optical disc is produced which is suppressed in warping and hence is stabilized in recording and/or reproducing characteristics.

DESCRIPTION OF PREFERRED EMBODIMENTS

Figure 1:
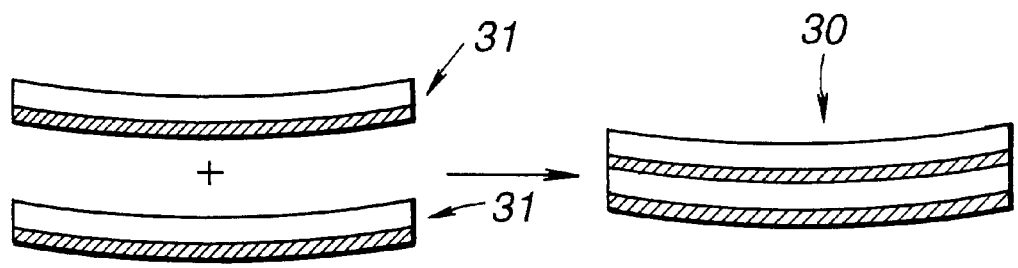
FIG. 1 is a schematic view showing an example of the relation between a conventional laminated optical disc and two optical discs.
Figure 2:
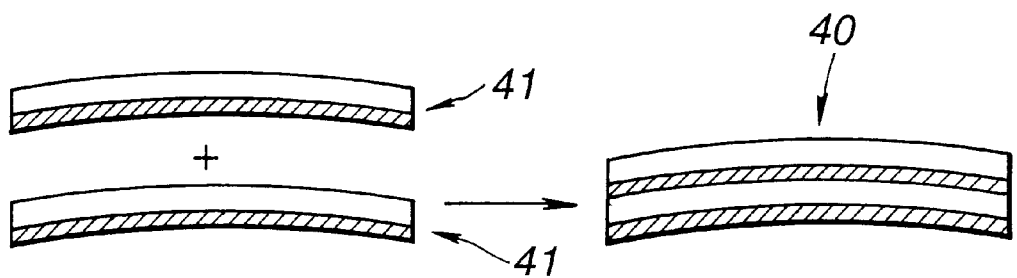
FIG. 2 is a schematic view showing another example of the relation between a conventional optical disc and two optical discs.
Figure 3:
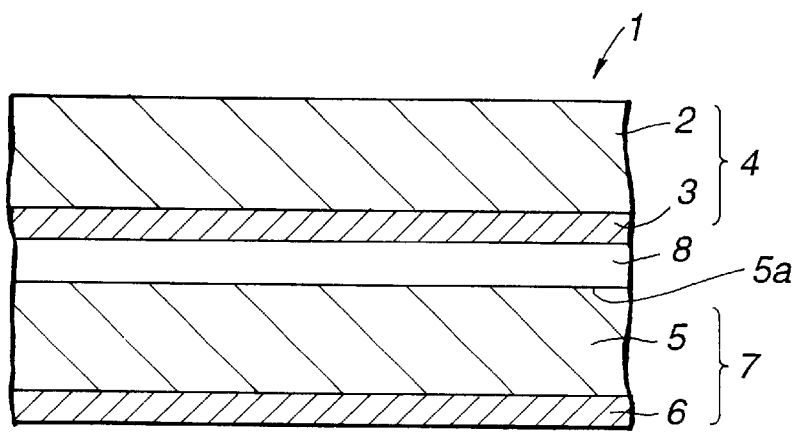
FIG. 3 is a cross-sectional view showing an example of an optical disc embodying the present invention.

Referring to the drawings, preferred embodiments of the present invention will be explained in detail.

An optical disc 1 according to the present invention includes a first optical disc 4, having a first information recording portion 3 on a surface of a first substrate 2, and a second optical disc 7, having a second information recording portion 6 on a surface of a second substrate 5 facing the first optical disc 4. The first optical disc 4 and the second optical disc 7 are laminated together with a resin layer 8 in-between. The surface of the first information recording portion 3 faces a surface 5a of the second substrate 5 not carrying the second information recording portion 6. The resin layer 8 is preferably formed of a UV curable resin.

In the first and second information recording portions 3 and 6, signal patterns, not shown, are formed by grooves or pits corresponding to information signals or patterns of lands and recesses. On the first and second information recording portions 3 and 6, that is on the above-mentioned signal patterns, there are formed reflective films or semi-transparent films, as will be explained subsequently.

Figure 4:
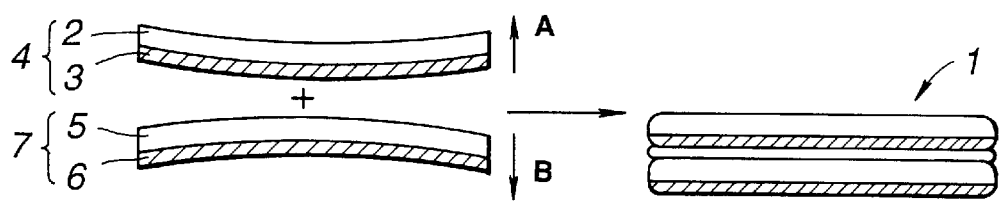
FIG. 4 is a schematic view showing an example of the relation between the optical disc embodying the present invention and first and second discs.

In particular, with the first optical disc 4 and the a second optical disc 7 used in the present invention, the direction of warping of the second optical disc 7, that is a direction A, is opposite to the direction of warping of the first optical disc 4, that is a direction B, as shown in FIG. 4.

That is, the optical disc 1 of the present invention is prepared by laminating the first and second optical discs 4 and 7 having the warping directions opposite to each other. Thus, the warping proper to each of the discs 4, 7 counterbalance each other to provide an optical disc free of warping. The result is that the optical disc 1 is reduced in focal point blurring of the laser light of the reproducing apparatus to realize stable playback signals and improved playback characteristics.

Moreover, with the optical disc of the present invention, in which the recording density can be increased to twice as high as that of the conventional single disc type optical disc, by laminating two optical discs, while there is no necessity of providing two optical pickup units, so that it becomes possible to access disc data promptly or to reduce the size of the device.

The warping proper to the first and second optical discs 4 and 7 is not limited to that shown in FIG. 4 since it suffices if the warping proper to the first and second optical discs 4 and 7 is opposite in direction. Thus, warping proper to the first and second optical discs 4 and 7 may be directed inwards towards the first and second information recording portions 3 and 4, that is in directions C and D, respectively.

Figure 6:
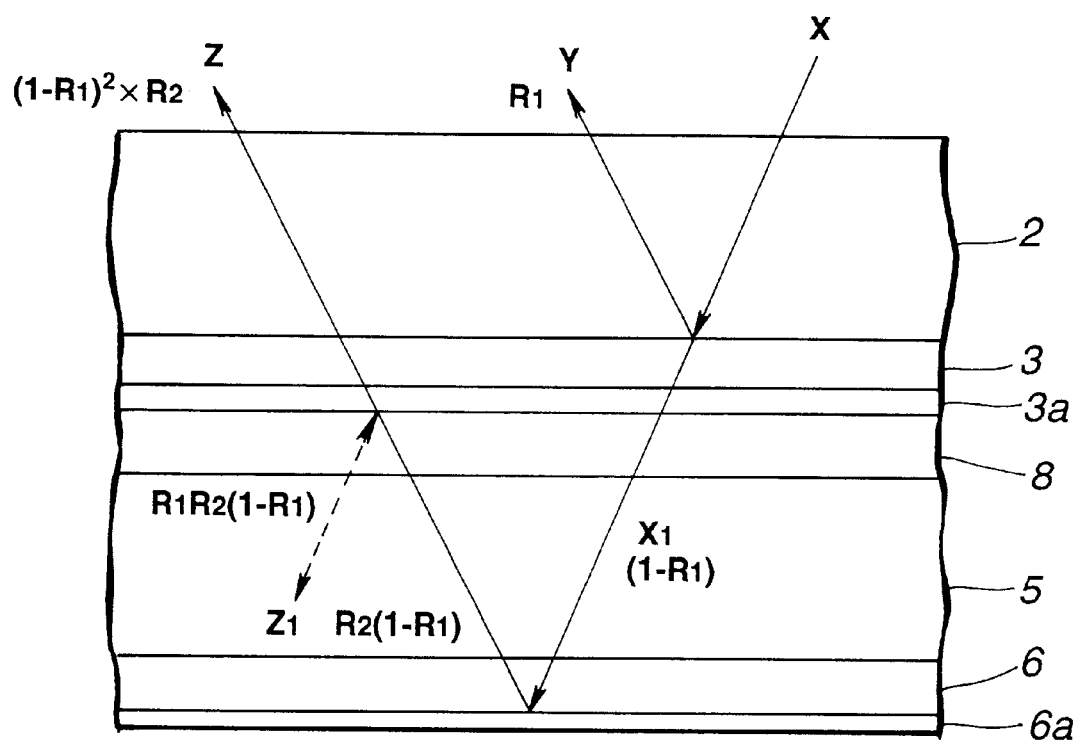
FIG. 6 is a schematic view for illustrating the relation between the reflectance of the first disc and that of the second disc in the optical disc according to the present invention.

Also, with the optical disc 1 according to the present invention, a semi-transparent film 3a is formed on the first information recording portion 3, whilst a functional film 6a of a pre-set reflectance is formed on the second information recording portion 6, as shown in FIG. 6. If the reflectance of the semi-transparent film 3a formed on the first information recording portion 3 is $R_1[\%]$ and that of the functional film 6a formed on the second information recording portion 6 is $R_2[\%]$, it is preferred that $R_1/100>0.1$ and $(1-R_1/100)^2 \times R_2/100>0.1$. In addition, it is preferred that $R_1[\%]$ is not larger than 50% and $R_2[\%]$ is not less than 50%. These conditions are derived as follows:

If the reflectance of the semi-transparent film 3a formed on the first information recording portion 3 is $R_1$ and that of the functional film 6a formed on the second information recording portion 6 is $R_2$, the relation shown in FIG. 6 is valid, as will now be explained. It should be noted however that the phenomenon of light refraction persists, although it is approximately disregarded in FIG. 6.

First, the light incident on the first substrate from a given direction, such as the direction X, is reflected on the semi-transparent film 3a in a direction indicated by arrow Y in FIG. 6. The reflectance of the semi-transparent film 3a is R1, so that, if the initially incident light volume, that is the light volume incident in the direction X, is e, the light volume detected from the first optical disc 4 is $R_1e$. That is, the reflectance of the first optical disc 4 is $R_1$.

The light from the direction X, transmitted through the semi-transparent film 3a, that is the light in the direction X1, is reflected on the functional film 6a and is partially reflected by the semi-transparent film 3a in the direction Z1. The remaining light is detected from the optical disc 1 as the light reflected in the direction Z. Since the light volume in the X1 direction is $(1-R_1)e$, the light volume reflected in the direction Z1 is $R_1R_2(1-R_1)e$, so that the light volume in the Z direction is $(1-R_1)^2 XR_2 e$.

That is, if the initially incident light volume, that is the light volume incident in the direction X on the first substrate, is e, the light volume of the laser light incident on the first substrate 2 and detected from the second optical disc 7, that is the light volume in the direction Z, is $(1-R_1)^2 XR_2 e$. Thus, in case of detection, with the focal point of the laser light incident on the first substrate 2 being formed on the second optical disc 7, is $(1-R_1)^2 XR_2$.

Usually, with the single surface readout type laminated disc, the laser light is selectively entered on the information recording portions of the first and second discs from above the first substrate, that is from the direction X, in order to perform servo control operation. Thus, it is necessary for the first and second discs to have the reflectance not smaller than 10%. Therefore, with the optical disc 1 according to the present invention, in which the reflectance of the first optical disc 4 is $R_1[\%]$ and that of the second optical disc 7 in case of detection of the laser light incident on the first substrate 2 from the second optical disc 7 is $(1-R_1)^2 XR_2[\%]$, it is necessary that the relation of $R1/100>0.1$ and $(1-R_1/100)^2 XR^2/100>0.1$ be met.

Figure 7:
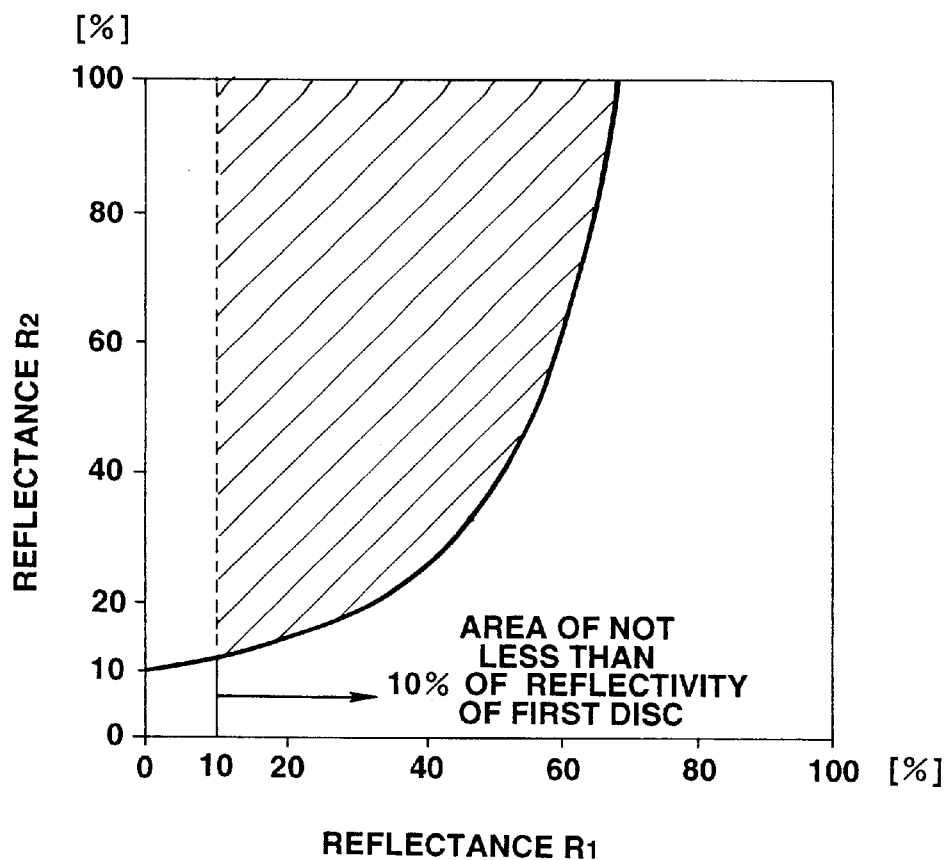
FIG. 7 is a graph for illustrating the relation between the reflectance of a semi-transparent formed on a first information recording portion, reflectance of a functional film formed on a second information recording portion and an area corresponding to the reflectance of not more than 10% of the first and second disc surfaces.

In FIG. 7, there is shown by hatching an area for which, with the reflectance $R_1$ of the semi-transparent film 3a and with the reflectance $R_2$ of the functional film 6a, the reflectance of the light detected from both surfaces of the first and second optical discs 4 and 7 amounts to not less than 10%.

As may be seen from FIG. 7, if the reflectance of the first and second optical discs 4 and 7 with respect to the incident light in the direction X is to be not less than 10%, it is preferred that the reflectance of the semi-transparent film 3a and that of the functional film 6a be not more than 50% and not less than 50%, respectively.

For preparing the optical disc 1, two substrates, carrying the information recording portions 3, 6, are formed by injection molding, using a stamper having a signal pattern transcribed thereon. By controlling the temperature difference between the metal mold of the information recording portion and that on the opposite side of the information recording portion, two substrates 2, 5, having the directions of warping opposite to each other, are prepared.

The above-mentioned semi-transparent film 3a or the functional film 6a are formed on each of the information recording portions 3, 6 of the substrates 2, 5 for fabricating the first optical disc 4 and the a second optical disc 7 opposite in the warping directions to each other.

Figure 5:
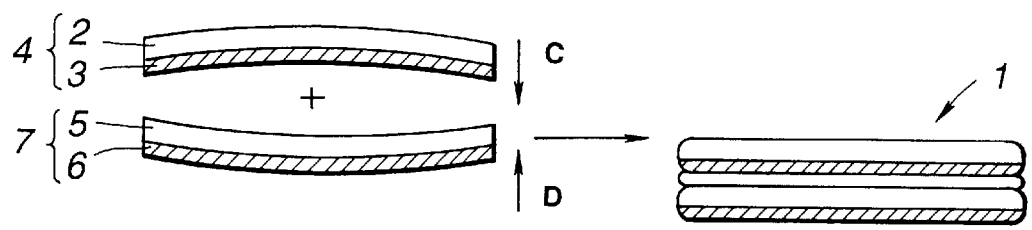
FIG. 5 is a schematic view showing an example of the relation between the optical disc embodying the present invention and first and second discs.

The first optical disc 4 and the a second optical disc 7, having the opposite warping directions, are bonded to each other by a UV curable resin, with the semi-transparent film 3a carrying the if recording portion 3 facing the surface 5a of the second substrate 5 not carrying the second information recording portion 6, to complete the optical disc 1, as shown in FIGS. 4 and 5.

By employing the manufacturing method for the optical disc 1 according to the present invention, as described above, the first optical disc 4 and the second optical disc 7, having the warping directions opposite to each other, are laminated to form a sole optical disc 1, so that the warping proper to the first optical disc 4 and that proper t the a second optical disc 7 can counterbalance each other, thus providing an optical disc 1 reduced in warping. The result is that focal point blurring of the laser light in the recording and/or reproducing apparatus can be suppressed to realize the stable recording and/or reproduction of information signals to produce an optical disc 1 having improved recording and/or reproducing performance.

Figure 8:
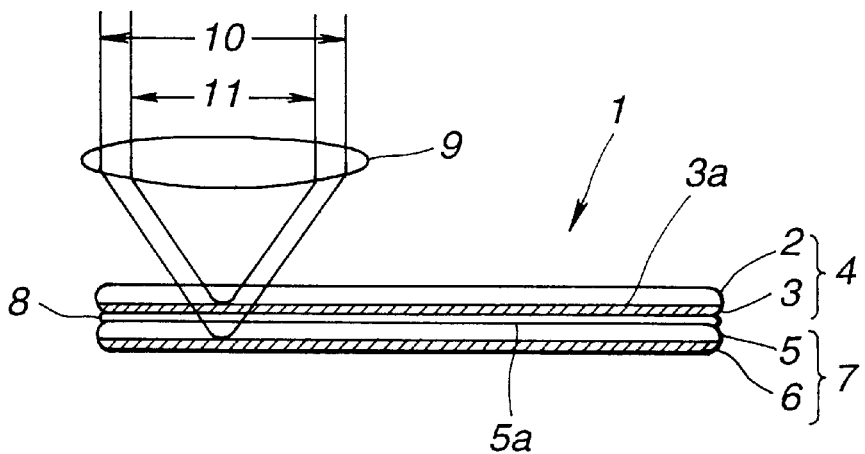
FIG. 8 is a schematic view showing an example of a reproducing apparatus employing an optical disc embodying the present invention.

Among the equipments for reproducing the above-described optical disc 1, there is such a equipment having a lens 9 capable of adjusting the focal length or spherical aberration, as shown in FIG. 8. If, with this lens 9, the signals recorded on the second information recording portion 6 is read out, a light beam 10 forms a focal point on the second information recording portion 6, whereas, if the signals recorded on the first information recording portion 3 is read out, a light beam 11 forms a focal point on the second information recording portion 3. This function of the lens 9 may be achieved in case of using a special hologram as a lens used in common to DVDs and CDs.

If, with the use of the above-described reproducing apparatus, a laser light beam 9 falls on the surface of the first substrate 2 opposite to the first information recording portion 3 for reproducing information signals, the focal point position of the laser light beam 9 is changed for selectively reproducing the first optical disc 4 or the a second optical disc 7.

The optical disc and the manufacturing method of the optical disc according to the present invention may also be applied to a recording device for recording on the optical disc 1.

What is claimed is:

1. An optical disc comprising:
   a first disc warped in a first direction when viewed in cross section and having a first information recording portion on a first surface of a first substrate, said first disc being warped in said first direction by controlling a temperature difference between a mold used to form said first surface of said first substrate and a mold used to form an opposite surface of said first substrate; and
   a second disc warped in a second direction opposite to the first direction when viewed in cross section, said second disc having a second information recording portion on a first surface of a second substrate, said second disc being warped in said second direction by controlling a temperature difference between a mold used to form said first surface of said second substrate and a mold used to form an opposite surface of said second substrate;
   wherein,
      said first disc is laminated to said second disc such that said first and second information recording portions do not face each other, and
      said optical disc is configured such that during reproduction of information signals in the information recording portions, a laser light beam is incident on a surface of the first substrate not carrying the first information recording portion, and the information signals in the first disc or the second disc are selectively reproduced by varying a focal point position of the laser light beam.

2. The optical disc as claimed in claim 1, wherein a semi-transparent film is formed on said first information recording portion, a functional film of a pre-set reflectance is formed on said second information recording portion; and wherein, a reflectance $R_1$ of the semi-transparent film formed on said first information recording portion and a reflectance $R_2$ of the functional film conform to the following relationships $R_1/100>0.1$ and $(1-R_1/100)^2 XR_2/100>0.1$, $R_1$ and $R_2$ being expresse percentages.

3. The optical disc as claimed in claim 2 wherein the reflectance $R_1$ of the semi-transparent film is not larger than 50% and the reflectance $R_2$ of the functional film is not less than 50%.

4. A method for producing an optical disc, said method comprising the steps of:

providing a first disc comprising a first substrate on a first surface of which is provided a first information recording portion, said first disc being warped in a first direction when viewed in cross section by controlling a temperature difference between a mold used to form said first surface of said first disc and a mold used to form an opposite surface of said first disc;

providing a second disc comprising a second substrate on a first surface of which is provided a second information recording portion, said second disc being warped in a second direction opposite the first direction when viewed in cross section by controlling a temperature difference between a mold used to form said first surface of said second disc and a mold used to form an opposite surface of said second disc;

laminating said first disc to said second disc such that said first and second information recording portions do not face each other.

5. The method of claim 4, comprising the steps of forming a semi-transparent film on said first information recording portion; forming a functional film of a pre-set reflectance on said second information recording portion;

wherein, a reflectance $R_1$ of the semi-transparent film formed on said first information recording portion and a reflectance $R_2$ of the functional film conform to the relationships: $R_1/100>0.1$ and $(1-R_1/100)^2 X R_2/100>0.1$, $R_1$ and $R_2$ being expressed as percentages.

6. The optical disc as claimed in claim 5, wherein the reflectance $R_1$ of the semi-transparent film is not larger than 50% and the reflectance $R_2$ of the semi-transparent film is not less than 50%.

* * * * *